(12) United States Patent
Pickelsimer et al.

(10) Patent No.: US 8,832,749 B2
(45) Date of Patent: Sep. 9, 2014

(54) PERSONALIZING TV CONTENT

(75) Inventors: Lisa A. Pickelsimer, Atlanta, GA (US); Yousef Wasef Nijim, Roswell, GA (US); Anant Patil, Marietta, GA (US); Daniel Lam, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 12/959,793

(22) Filed: Dec. 3, 2010

(65) Prior Publication Data

US 2011/0202945 A1 Aug. 18, 2011

Related U.S. Application Data

(60) Provisional application No. 61/304,028, filed on Feb. 12, 2010.

(51) Int. Cl.
| | |
|---|---|
| *H04N 7/16* | (2011.01) |
| *H04N 7/173* | (2011.01) |
| *H04N 21/472* | (2011.01) |
| *H04N 21/81* | (2011.01) |
| *H04N 21/482* | (2011.01) |
| *H04N 21/478* | (2011.01) |
| *H04N 21/4722* | (2011.01) |
| *H04N 5/445* | (2011.01) |
| *H04N 21/433* | (2011.01) |

(52) U.S. Cl.
CPC ..... *H04N 21/4722* (2013.01); *H04N 21/47214* (2013.01); *H04N 21/8133* (2013.01); *H04N 21/482* (2013.01); *H04N 21/478* (2013.01); *H04N 5/44543* (2013.01); *H04N 21/47211* (2013.01); *H04N 21/4331* (2013.01)
USPC .................................. 725/80; 725/46; 725/48

(58) Field of Classification Search
USPC ..................................................... 725/48, 80
See application file for complete search history.

(56) References Cited

U.S. PATENT DOCUMENTS

| | | |
|---|---|---|
| 5,565,909 A | 10/1996 | Thibadeau et al. |
| 5,583,560 A | 12/1996 | Florin et al. |
| 5,808,662 A | 9/1998 | Kinney et al. |
| 5,812,123 A | 9/1998 | Rowe et al. |
| 5,818,439 A | 10/1998 | Nagasaka et al. |
| 5,861,906 A | 1/1999 | Dunn et al. |
| 6,144,375 A | 11/2000 | Jain et al. |
| 6,188,398 B1 | 2/2001 | Collins-Rector et al. |
| 6,282,713 B1 | 8/2001 | Kitsukawa et al. |

(Continued)

FOREIGN PATENT DOCUMENTS

JP    2002-218428    8/2002

OTHER PUBLICATIONS

U.S. Office Action dated Apr. 26, 2011 cited in U.S. Appl. No. 12/126,096.

(Continued)

*Primary Examiner* — Benjamin R Bruckart
*Assistant Examiner* — Carmine Malangone
(74) *Attorney, Agent, or Firm* — Merchant & Gould (57) ABSTRACT

Storing information associated with content may be provided. First, information associated with available content may be presented to a user via a user device. Next, a user selection for an item of content may be received. In a dedicated memory location for the user, identifying information for the selected item of content may then be stored.

21 Claims, 6 Drawing Sheets

(56) References Cited

U.S. PATENT DOCUMENTS

| | | |
|---|---|---|
| 6,438,579 B1 | 8/2002 | Hosken |
| 6,615,248 B1 | 9/2003 | Smith |
| 6,754,904 B1 | 6/2004 | Cooper et al. |
| 6,934,963 B1 | 8/2005 | Reynolds et al. |
| 6,968,364 B1 | 11/2005 | Wong et al. |
| 6,983,426 B1 | 1/2006 | Kobayashi et al. |
| 7,017,173 B1 | 3/2006 | Armstrong et al. |
| 7,080,139 B1 | 7/2006 | Briggs et al. |
| 7,228,305 B1 | 6/2007 | Eyal et al. |
| 7,246,367 B2 | 7/2007 | Livonen |
| 7,249,366 B1 | 7/2007 | Flavin |
| 7,272,844 B1 | 9/2007 | Bankers et al. |
| 7,290,211 B2 | 10/2007 | Goodwin et al. |
| 7,363,644 B2 | 4/2008 | Wugofski |
| 7,584,214 B2 | 9/2009 | Narahara et al. |
| 7,596,761 B2 | 9/2009 | Lemay et al. |
| 7,669,219 B2 | 2/2010 | Scott, III |
| 7,673,315 B1 | 3/2010 | Wong et al. |
| 7,685,204 B2 | 3/2010 | Rogers |
| 7,698,263 B2 | 4/2010 | Pickelsimer et al. |
| 7,716,376 B1 | 5/2010 | Price et al. |
| 7,877,293 B2 | 1/2011 | Biebesheimer et al. |
| 7,886,327 B2 | 2/2011 | Stevens |
| 7,895,625 B1 | 2/2011 | Bryan et al. |
| 7,904,924 B1 | 3/2011 | de Heer et al. |
| 7,933,789 B2 | 4/2011 | Boland et al. |
| 7,992,163 B1 | 8/2011 | Jerding et al. |
| 8,090,606 B2 | 1/2012 | Svendsen |
| 8,091,032 B2 | 1/2012 | Fischer |
| 8,220,021 B1 | 7/2012 | Look et al. |
| 8,364,013 B2 | 1/2013 | Nijim |
| 8,418,204 B2 | 4/2013 | Pickelsimer et al. |
| 8,789,102 B2 | 7/2014 | Pickelsimer et al. |
| 8,789,117 B2 | 7/2014 | Nijim |
| 2001/0001160 A1 | 5/2001 | Shoff et al. |
| 2001/0037367 A1 | 11/2001 | Iyer |
| 2002/0007485 A1 | 1/2002 | Rodriguez et al. |
| 2002/0056123 A1 | 5/2002 | Liwerant et al. |
| 2002/0057297 A1* | 5/2002 | Grimes et al. ............... 345/810 |
| 2002/0069218 A1 | 6/2002 | Sull et al. |
| 2002/0087982 A1 | 7/2002 | Stuart |
| 2002/0120757 A1 | 8/2002 | Sutherland et al. |
| 2002/0124252 A1 | 9/2002 | Schaefer et al. |
| 2002/0128831 A1 | 9/2002 | Ju et al. |
| 2002/0144273 A1 | 10/2002 | Reto |
| 2002/0156852 A1 | 10/2002 | Hughes et al. |
| 2002/0174430 A1 | 11/2002 | Ellis et al. |
| 2002/0194195 A1 | 12/2002 | Fenton et al. |
| 2002/0199188 A1 | 12/2002 | Sie et al. |
| 2003/0002849 A1 | 1/2003 | Lord |
| 2003/0021582 A1 | 1/2003 | Sawada |
| 2003/0084449 A1 | 5/2003 | Chane et al. |
| 2003/0093790 A1 | 5/2003 | Logan et al. |
| 2003/0093806 A1 | 5/2003 | Dureau et al. |
| 2003/0112467 A1 | 6/2003 | McCollum et al. |
| 2003/0115592 A1 | 6/2003 | Johnson |
| 2003/0154477 A1* | 8/2003 | Hassell et al. ............... 725/39 |
| 2003/0156827 A1 | 8/2003 | Janevski |
| 2003/0177497 A1 | 9/2003 | Macrae et al. |
| 2003/0206710 A1* | 11/2003 | Ferman et al. ............... 386/46 |
| 2003/0208763 A1 | 11/2003 | McElhatten et al. |
| 2003/0220100 A1 | 11/2003 | McElhatten et al. |
| 2003/0225846 A1 | 12/2003 | Heikes et al. |
| 2003/0229900 A1 | 12/2003 | Reisman |
| 2004/0034867 A1 | 2/2004 | Rashkovskiy et al. |
| 2004/0060063 A1 | 3/2004 | Russ et al. |
| 2004/0064835 A1 | 4/2004 | Bellwood et al. |
| 2004/0078807 A1 | 4/2004 | Fries et al. |
| 2004/0078814 A1 | 4/2004 | Allen |
| 2004/0103167 A1 | 5/2004 | Grooters et al. |
| 2004/0117786 A1 | 6/2004 | Kellerman et al. |
| 2004/0210928 A1 | 10/2004 | Hamzy et al. |
| 2004/0255336 A1 | 12/2004 | Logan et al. |
| 2004/0255340 A1 | 12/2004 | Logan |
| 2004/0268386 A1 | 12/2004 | Logan et al. |
| 2005/0022241 A1 | 1/2005 | Griggs |
| 2005/0028208 A1* | 2/2005 | Ellis et al. ............... 725/58 |
| 2005/0044565 A1 | 2/2005 | Jerding et al. |
| 2005/0055710 A1 | 3/2005 | Aoki et al. |
| 2005/0076363 A1 | 4/2005 | Dukes et al. |
| 2005/0091316 A1 | 4/2005 | Ponce et al. |
| 2005/0149880 A1 | 7/2005 | Postrel |
| 2005/0210145 A1 | 9/2005 | Kim et al. |
| 2005/0246739 A1 | 11/2005 | Davidson |
| 2005/0251820 A1* | 11/2005 | Stefanik et al. ............... 725/34 |
| 2005/0262542 A1 | 11/2005 | DeWeese et al. |
| 2005/0278443 A1 | 12/2005 | Winner et al. |
| 2005/0278740 A1 | 12/2005 | Helms |
| 2005/0278761 A1 | 12/2005 | Gonder et al. |
| 2005/0283813 A1 | 12/2005 | Jamail et al. |
| 2006/0005207 A1 | 1/2006 | Louch et al. |
| 2006/0020904 A1* | 1/2006 | Aaltonen et al. ............... 715/850 |
| 2006/0031882 A1 | 2/2006 | Swix et al. |
| 2006/0041927 A1 | 2/2006 | Stark et al. |
| 2006/0059514 A1 | 3/2006 | Hsiao et al. |
| 2006/0059526 A1 | 3/2006 | Poslinski |
| 2006/0075019 A1 | 4/2006 | Donovan et al. |
| 2006/0080408 A1 | 4/2006 | Istvan et al. |
| 2006/0090183 A1 | 4/2006 | Zito et al. |
| 2006/0112325 A1 | 5/2006 | Ducheneaut et al. |
| 2006/0130093 A1 | 6/2006 | Feng et al. |
| 2006/0143236 A1 | 6/2006 | Wu |
| 2006/0161950 A1 | 7/2006 | Imai et al. |
| 2006/0174277 A1 | 8/2006 | Sezan et al. |
| 2006/0184972 A1* | 8/2006 | Rafey et al. ............... 725/80 |
| 2006/0190966 A1 | 8/2006 | McKissick et al. |
| 2006/0195479 A1 | 8/2006 | Spiegelman et al. |
| 2006/0248557 A1 | 11/2006 | Stark et al. |
| 2006/0253874 A1 | 11/2006 | Stark et al. |
| 2006/0259926 A1 | 11/2006 | Scheelke et al. |
| 2006/0271959 A1 | 11/2006 | Jacoby et al. |
| 2006/0282856 A1 | 12/2006 | Errico et al. |
| 2007/0033533 A1 | 2/2007 | Sull |
| 2007/0061835 A1 | 3/2007 | Klein et al. |
| 2007/0106627 A1 | 5/2007 | Srivastava et al. |
| 2007/0123353 A1 | 5/2007 | Smith |
| 2007/0124795 A1 | 5/2007 | McKissick et al. |
| 2007/0150918 A1 | 6/2007 | Carpenter et al. |
| 2007/0186180 A1 | 8/2007 | Morgan |
| 2007/0186231 A1* | 8/2007 | Haeuser et al. ............... 725/25 |
| 2007/0186243 A1 | 8/2007 | Pettit et al. |
| 2007/0198532 A1 | 8/2007 | Krikorian et al. |
| 2007/0214473 A1 | 9/2007 | Barton et al. |
| 2007/0220566 A1 | 9/2007 | Ahmad-Taylor |
| 2007/0245367 A1 | 10/2007 | Ogawa |
| 2007/0256103 A1 | 11/2007 | Knudson |
| 2007/0271338 A1 | 11/2007 | Anschutz |
| 2007/0277205 A1 | 11/2007 | Grannan |
| 2007/0282949 A1 | 12/2007 | Fischer et al. |
| 2007/0294726 A1 | 12/2007 | Drazin |
| 2007/0298401 A1 | 12/2007 | Mohanty et al. |
| 2008/0010153 A1 | 1/2008 | Pugh-O'Connor et al. |
| 2008/0022320 A1 | 1/2008 | VerSteeg |
| 2008/0036917 A1 | 2/2008 | Pascarella et al. |
| 2008/0040370 A1 | 2/2008 | Bosworth et al. |
| 2008/0052371 A1 | 2/2008 | Partovi et al. |
| 2008/0065758 A1 | 3/2008 | Narayanaswami |
| 2008/0066111 A1 | 3/2008 | Ellis et al. |
| 2008/0066114 A1 | 3/2008 | Carlson et al. |
| 2008/0082606 A1 | 4/2008 | Gupta et al. |
| 2008/0086456 A1 | 4/2008 | Rasanen et al. |
| 2008/0092168 A1 | 4/2008 | Logan et al. |
| 2008/0098323 A1 | 4/2008 | Vallone et al. |
| 2008/0114861 A1 | 5/2008 | Gildred |
| 2008/0126936 A1 | 5/2008 | Williams |
| 2008/0155600 A1 | 6/2008 | Klappert et al. |
| 2008/0163307 A1 | 7/2008 | Coburn et al. |
| 2008/0168506 A1 | 7/2008 | Pickelsimer et al. |
| 2008/0168515 A1 | 7/2008 | Benson et al. |
| 2008/0177727 A1 | 7/2008 | Pickelsimer et al. |
| 2008/0178218 A1 | 7/2008 | Pickelsimer et al. |
| 2008/0235733 A1 | 9/2008 | Heie et al. |
| 2008/0247730 A1 | 10/2008 | Barton et al. |
| 2008/0263595 A1 | 10/2008 | Sumiyoshi et al. |

(56) References Cited

U.S. PATENT DOCUMENTS

| | | | |
|---|---|---|---|
| 2008/0276278 A1 | 11/2008 | Krieger et al. | |
| 2008/0288596 A1 | 11/2008 | Smith et al. | |
| 2008/0313541 A1 | 12/2008 | Shafton et al. | |
| 2008/0320139 A1 | 12/2008 | Fukuda et al. | |
| 2009/0019374 A1 | 1/2009 | Logan et al. | |
| 2009/0049098 A1 | 2/2009 | Pickelsimer et al. | |
| 2009/0049118 A1 | 2/2009 | Stevens | |
| 2009/0049473 A1 | 2/2009 | Pickelsimer et al. | |
| 2009/0055743 A1 | 2/2009 | Pickelsimer et al. | |
| 2009/0055868 A1* | 2/2009 | Wehmeyer et al. | 725/40 |
| 2009/0063994 A1 | 3/2009 | Pickelsimer et al. | |
| 2009/0094643 A1 | 4/2009 | Pickelsimer et al. | |
| 2009/0100469 A1 | 4/2009 | Conradt et al. | |
| 2009/0125843 A1 | 5/2009 | Billmaier et al. | |
| 2009/0172127 A1 | 7/2009 | Srikanth et al. | |
| 2009/0172543 A1 | 7/2009 | Cronin et al. | |
| 2009/0178081 A1 | 7/2009 | Goldenberg et al. | |
| 2009/0199242 A1 | 8/2009 | Johnson et al. | |
| 2009/0307719 A1* | 12/2009 | Clark et al. | 725/32 |
| 2009/0310933 A1 | 12/2009 | Lee | |
| 2009/0313664 A1 | 12/2009 | Patil et al. | |
| 2010/0042746 A1 | 2/2010 | Keum et al. | |
| 2010/0064320 A1 | 3/2010 | Angiolillo et al. | |
| 2010/0107194 A1 | 4/2010 | McKissick et al. | |
| 2010/0175084 A1 | 7/2010 | Ellis et al. | |
| 2010/0192173 A1* | 7/2010 | Mizuki et al. | 725/25 |
| 2011/0010744 A1* | 1/2011 | Stecyk et al. | 725/80 |
| 2011/0013885 A1 | 1/2011 | Wong et al. | |
| 2011/0072455 A1 | 3/2011 | Pickelsimer et al. | |
| 2011/0090402 A1 | 4/2011 | Huntington et al. | |
| 2011/0107389 A1 | 5/2011 | Chakarapani | |
| 2011/0131600 A1* | 6/2011 | Howcroft et al. | 725/28 |
| 2011/0138423 A1 | 6/2011 | Pickelsimer et al. | |
| 2011/0283313 A1 | 11/2011 | Gathen et al. | |
| 2012/0051717 A1 | 3/2012 | Nijim | |
| 2012/0054808 A1 | 3/2012 | Nijim | |
| 2012/0054810 A1 | 3/2012 | Nijim | |
| 2012/0222056 A1 | 8/2012 | Donoghue et al. | |
| 2012/0284744 A1 | 11/2012 | Kumar | |
| 2013/0167168 A1 | 6/2013 | Ellis et al. | |

OTHER PUBLICATIONS

U.S. Office Action dated Mar. 26, 2012 cited in U.S. Appl. No. 12/126,060, 26 pgs.

U.S. Final Office Action dated Aug. 15, 2012 cited in U.S. Appl. No. 12/126,025, 33 pgs.

U.S. Final Office Action dated Aug. 23, 2012 cited in U.S. Appl. No. 12/126,060, 30 pgs.

U.S. Final Office Action dated Aug. 29, 2012 cited in U.S. Appl. No. 12/868,838, 7 pgs.

U.S. Office Action dated Jun. 7, 2011 cited in U.S. Appl. No. 11/651,140.

U.S. Final Office Action dated Jun. 13, 2011 cited in U.S. Appl. No. 12/126,060.

U.S. Final Office Action dated Jun. 21, 2011 cited in U.S. Appl. No. 12/126,025.

U.S. Appl. No. 13/221,151, filed Aug. 30, 2011 entitled "Sharing Digitally Recorded Content".

U.S. Final Office Action dated Sep. 29, 2011 cited in U.S. Appl. No. 12/126,096.

U.S. Office Action dated Feb. 14, 2011 cited in U.S. Appl. No. 12/126,025.

U.S. Office Action dated Feb. 17, 2011 cited in U.S. Appl. No. 12/126,060.

U.S. Office Action dated Feb. 18, 2011 cited in U.S. Appl. No. 12/545,099.

U.S. Office Action dated Feb. 28, 2011 cited in U.S. Appl. No. 11/651,140.

U.S. Final Office Action dated Mar. 2, 2011 cited in U.S. Appl. No. 11/787,732.

U.S. Final Office Action dated Mar. 2, 2011 cited in U.S. Appl. No. 12/126,165.

U.S. Office Action dated Dec. 28, 2011 cited in U.S. Appl. No. 12/545,099, 13 pgs.

U.S. Office Action dated Jan. 5, 2012 cited in U.S. Appl. No. 12/126,096, 20 pgs.

Copending U.S. Appl. No. 12/959,731, filed Dec. 3, 2010 entitled "Providing a Media Guide Including Parental Information".

Copending U.S. Appl. No. 12/959,665, filed Dec. 3, 2010 entitled "Content Recommendations".

Copending U.S. Appl. No. 12/868,801, filed Aug. 26, 2010 entitled "Content Library".

Copending U.S. Appl. No. 12/868,824, filed Aug. 26, 2010 entitled "Playlist Bookmarking".

Copending U.S. Appl. No. 12/868,838, filed Aug. 26, 2010 entitled "Content Bookmarking".

J. Bouwen et al., "Community Meets Entertainment: Community Television," Technology White Paper, Alcatel Telecommunications Review, 1st Quarter 2005, pp. 1-8, http://www.alcatel.com/doctypes/articlespaperlibrary/pdf/ATR2005QI/T0503-Community_TV-EN.pdf.

U.S. Office Action dated Apr. 28, 2009 cited in U.S. Appl. No. 11/787,733.

U.S. Office Action dated Jun. 22, 2009 cited in U.S. Appl. No. 11/787,732.

U.S. Final Office Action dated Dec. 30, 2009 cited in U.S. Appl. No. 11/787,732.

U.S. Office Action dated Sep. 14, 2010 cited in U.S. Appl. No. 11/651,140.

U.S. Office Action dated Sep. 14, 2010 cited in U.S. Appl. No. 11/787,732.

U.S. Office Action dated Sep. 30, 2010 cited in U.S. Appl. No. 12/126,165.

U.S. Office Action dated Oct. 5, 2010 cited in U.S. Appl. No. 12/126,096.

U.S. Final Office Action dated Dec. 22, 2010 cited in U.S. Appl. No. 11/651,140.

U.S. Final Office Action dated Jan. 14, 2011 cited in U.S. Appl. No. 12/126,096.

U.S. Final Office Action dated May 31, 2012 cited in U.S. Appl. No. 12/126,165, 23 pgs.

U.S. Office Action dated Jun. 5, 2012 cited in U.S. Appl. No. 12/126,126, 40 pgs.

U.S. Office Action dated Jun. 20, 2012 cited in U.S. Appl. No. 12/959,731, 30 pgs.

U.S. Office Action dated Jan. 18, 2012 cited in U.S. Appl. No. 12/126,025, 27 pgs.

U.S. Office Action dated Jan. 19, 2012 cited in U.S. Appl. No. 12/126,165, 20 pgs.

U.S. Office Action dated Jan. 19, 2012 cited in U.S. Appl. No. 11/651,140, 21 pgs.

U.S. Final Office Action dated Apr. 20, 2012 cited in U.S. Appl. No. 12/126,096, 25 pgs.

U.S. Final Office Action dated Apr. 25, 2012 cited in U.S. Appl. No. 12/545,099, 16 pgs.

U.S. Final Office Action dated Apr. 25, 2012 cited in U.S. Appl. No. 11/651,140, 21 pgs.

U.S. Office Action dated May 21, 2012 cited in U.S. Appl. No. 12/868,838, 22 pgs.

U.S. Final Office Action dated Aug. 5, 2011 cited in U.S. Appl. No. 12/545,099.

U.S. Final Office Action dated Sep. 27, 2011 cited in U.S. Appl. No. 11/651,140.

U.S. Office Action dated Nov. 5, 2012 cited in U.S. Appl. No. 12/126,096, 23 pgs.

U.S. Office Action dated Nov. 20, 2012 cited in U.S. Appl. No. 13/221,151, 29 pgs.

U.S. Office Action dated Nov. 29, 2012 cited in U.S. Appl. No. 12/868,824, 33 pgs.

U.S. Office Action dated Dec. 19, 2012 cited in U.S. Appl. No. 12/126,025, 30 pgs.

U.S. Final Office Action dated Dec. 28, 2012 cited in U.S. Appl. No. 12/126,126, 24 pgs.

U.S. Office Action dated Sep. 13, 2012 cited in U.S. Appl. No. 11/651,140, 23 pgs.

(56) References Cited

OTHER PUBLICATIONS

U.S. Office Action dated Oct. 4, 2012 cited in U.S. Appl. No. 12/868,801, 27 pgs.
U.S. Office Action dated Oct. 9, 2012 cited in U.S. Appl. No. 12/545,099, 21 pgs.
U.S. Final Office Action dated Oct. 9, 2012 cited in U.S. Appl. No. 12/959,731, 19 pgs.
U.S. Office Action dated Oct. 24, 2012 cited in U.S. Appl. No. 12/126,165, 25 pgs.
U.S. Office Action dated Aug. 21, 2013 cited in U.S. Appl. No. 12/126,096, 23 pgs.
U.S. Office Action dated Sep. 9, 2013 cited in U.S. Appl. No. 13/221,151, 16 pgs.
U.S. Office Action dated May 22, 2013 cited in U.S. Appl. No. 11/651,140, 20 pgs.
U.S. Office Action dated Jun. 20, 2013 cited in U.S. Appl. No. 12/126,126, 27 pgs.
U.S. Final Office Action dated Feb. 26, 2013 cited in U.S. Appl. No. 11/651,140, 21 pgs.
U.S. Final Office Action dated Mar. 1, 2013 cited in U.S. Appl. No. 13/221,151, 15 pgs.
U.S. Final Office Action dated Mar. 27, 2013 cited in U.S. Appl. No. 12/126,096, 25 pgs.
U.S. Office Action dated Apr. 3, 2013 cited in U.S. Appl. No. 12/959,665, 45 pgs.
U.S. Office Action dated Apr. 11, 2013 cited in U.S. Appl. No. 12/959,731, 22 pgs.
U.S. Final Office Action dated Apr. 11, 2013 cited in U.S. Appl. No. 12/126,025, 28 pgs.
U.S. Final Office Action dated Apr. 25, 2013 cited in U.S. Appl. No. 12/126,165, 26 pgs.
U.S. Final Office Action dated Apr. 30, 2013 cited in U.S. Appl. No. 12/868,801, 13 pgs.
U.S. Final Office Action dated May 3, 2013 cited in U.S. Appl. No. 12/545,099, 20 pgs.
U.S. Office Action dated May 14, 2013 cited in U.S. Appl. No. 12/868,824, 12 pgs.
U.S. Final Office Action dated Aug. 1, 2013 cited in U.S. Appl. No. 12/959,731, 23 pgs.
U.S. Final Office Action dated Aug. 14, 2013 cited in U.S. Appl. No. 12/959,665, 30 pgs.
U.S. Office Action dated Aug. 16, 2013 cited in U.S. Appl. No. 12/868,801, 13 pgs.
U.S. Final Office Action dated Dec. 24, 2013 cited in U.S. Appl. No. 13/221,151, 17 pgs.
U.S. Final Office Action dated Jan. 9, 2014 cited in U.S. Appl. No. 12/126,096, 26 pgs.
U.S. Office Action dated Mar. 6, 2014 cited in U.S. Appl. No. 12/959,731, 16 pgs.
U.S. Office Action dated Mar. 18, 2014 cited in U.S. Appl. No. 11/651,140, 18 pgs.
U.S. Office Action dated Mar. 21, 2014 cited in U.S. Appl. No. 12/868,824, 12 pgs.
U.S. Office Action dated Oct. 4, 2013 cited in U.S. Appl. No. 12/126,165, 28 pgs.
U.S. Final Office Action dated Oct. 10, 2013 cited in U.S. Appl. No. 12/126,126, 23 pgs.
U.S. Final Office Action dated Oct. 28, 2013 cited in U.S. Appl. No. 11/651,140, 19 pgs.
U.S. Office Action dated Oct. 29, 2013 cited in U.S. Appl. No. 12/126,060, 27 pgs.
U.S. Final Office Action dated Nov. 1, 2013 cited in U.S. Appl. No. 12/868,824, 15 pgs.
U.S. Final Office Action dated Apr. 3, 2014 in U.S. Appl. No. 12/126,060, 18 pgs.
U.S. Office Action dated May 20, 2014 in U.S. Appl. No. 12/126,096, 19 pgs.
U.S. Office Action dated May 21, 2014 in U.S. Appl. No. 13/221,151, 18 pgs.

* cited by examiner

PERSONALIZING TV CONTENT

RELATED APPLICATION

Under provisions of 35 U.S.C. §119(e), Applicants claim benefit of U.S. provisional application No. 61/304,028, filed Feb. 12, 2010, which is incorporated herein by reference.

BACKGROUND

Customers may receive content from service providers such as cable companies, satellite providers, or other service provider types. These customers may browse and purchase video on demand (VOD) content such as VOD movies, television shows, etc. The customer may use a set top box (STB) to browse or preview available VOD content. The customer may then select specific VOD content for viewing or purchase. However, the customer may not have time to view the selected VOD content when navigating through the available content. Moreover, at a subsequent time when the customer has time to view the selected VOD content, the customer may be unable to navigate to or locate the selected content. This may lead to customer frustration and lost revenue for the service provider.

SUMMARY

Storing information associated with content may be provided. First, information associated with available content may be presented to a user via a user device. Next, a user selection for an item of content may be received. In a dedicated memory location for the user, identifying information for the selected item of content may then be stored.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content programs to users (e.g. customers) over a content delivery system. The content programs may be delivered over a plurality of content channels (e.g. linear TV) or via video on demand (VOD) that the user may select among using a set-top box (STB), for example. Keeping tract of what content programs may be difficult especially when it come to VOD. Consequently, embodiments of the invention may store information associated with content (e.g. VOD content) in one or more designated folders that may be easily navigated by a user at a subsequent time. While embodiments of the invention may be described in terms of VOD content, the invention is not so limited. Consistent with embodiments of the invention, content may include, but not limited to, VOD content, linear TV, recorded programs from a digital video recorder (DVR), and content from a network such as the internet (e.g. Youtube, Hulu, etc.) for example.

Consistent with embodiments of the invention, a "My Favorites" feature may allow users to mark or add a VOD asset (e.g., a movie, television show, video clip, audio, etc.) to a folder that can be easily accessed by the user at a subsequent time. For example, the user may discover a VOD asset during navigation that they may wish to purchase or watch at a later time. Consequently, the user may add the VOD asset to a My Favorites folder associated with the user. The user may be able to navigate available VOD content utilizing any number of suitable user devices and/or techniques, such as a STB, a web portal accessed via a suitable computing device (e.g. a personal computer), or a mobile device (e.g. a smart phone) equipped with a mobile device browser or dedicated application for navigating or viewing available VOD content. As desired, any number of device types and/or devices may be associated with a user account. Navigating back to the asset in the My Favorites folder may be easier and faster for the user. In this regard, the user may not be required to remember or recall, for example, the category/folder/business service where the VOD asset is located.

The user may be able to find assets by searching on the web portal or mobile device in addition to searching for content from the STB. When searching for an asset from the STB, a wide variety of user guides may be utilized as desired in various embodiments of the invention. Additionally, the user may be able to view auto generated recommendations or recommendations from other users on the STB, web portal, or mobile device (e.g., a list of most purchased or most watched movies or video clips, a list of new releases, etc.). The user may navigate, search, or "browse related" VOD assets across the three platforms (e.g. STB, web portal, and mobile device.) Consistent with embodiments of the invention, users may access the web portal or the mobile device through a user ID and password that could be linked to the user's ID and PIN from the STB. The My Favorites folder may be personalized for each user within the household. In this regard, each user may have one or more unique lists. For example, content selected by the user may be added to a unique MyFavorites folder associated with the user. As desired, MyFavorites folders may also be generated by a user, and the user may add content to designated lists or folders. For example, a user may generate one folder for sports content, another folder for movies, etc.

Consistent with embodiments of the invention, the MY Favorites feature may allow users to perform one or more of the following features: i) watch assets later at the user's leisure time from one or more of the three platforms; ii) remove assets from the folder; and iii) edit the folder. Furthermore, users may be able to create playlists that may allow users to add VOD assets to a playlist from the MyFavorites folder or the VOD categories and business services. The playlists may be created across the three platforms and users may be able to view/play the playlists when applicable on the three platforms. A playlist may be personalized for each user within a household. Each user may be able to create multiple playlists where he/she is able to add the same or different assets to a playlist. With a playlist, the user may be able to perform one or more of the following: i) edit a playlist; ii) create and name a playlist; iii) delete a playlist; iv) remove/add assets to a playlist. Users from the STB, web portal, or mobile device may have the option to: i) view an asset where available; ii) cancel to return back to the previous screen; iii) add the asset to the My Favorites folder; iv) browse poster arts, trailers, etc; v) add assets to playlists; vi) create multiple play lists; vii) search and browse related assets; viii) create/edit users' profiles; ix) My Favorites folder and playlists are synchronized and updated through the available platforms in real-time or near real-time; and x) watch an asset on one platform and continue watching the same asset on another platform (e.g. synchronize an asset bookmark through the available platforms).

Figure 1:
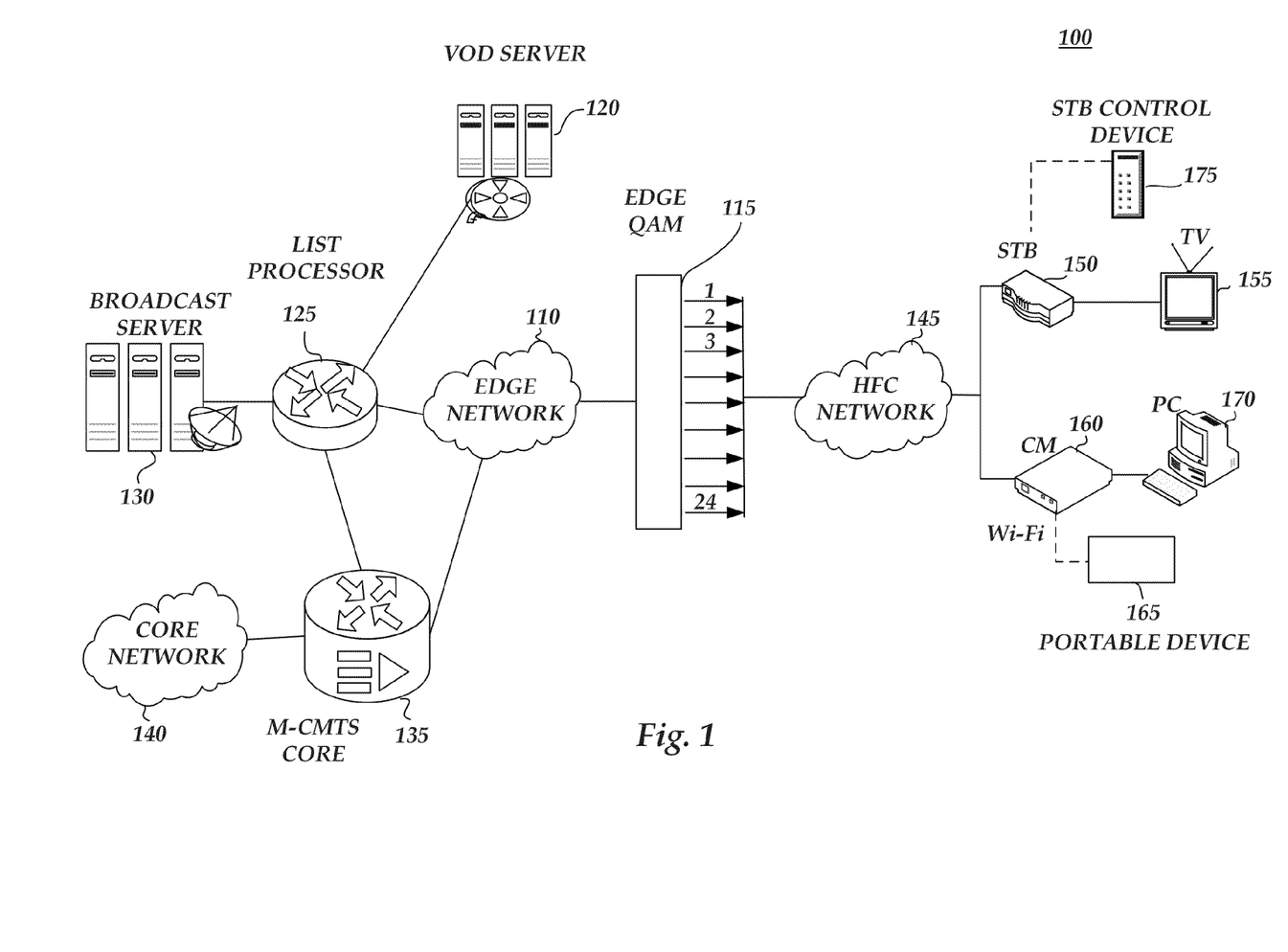
FIG. 1 is a block diagram of an operating environment including a list processor.

FIG. 1 is a block diagram of a content delivery system 100. Consistent with embodiments of the present invention, system 100 may comprise an edge network 110, an edge quadrature amplitude modulation (QAM) device 115, a video-on-demand (VOD) server 120, a list processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a television (TV) 155, a cable modem (CM) 160, a portable device 165, a personal computer (PC) 170, and a STB control device 175. List processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, list processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

TV 155 may comprise an end use device for displaying delivered broadband services. TV 155 may comprise, for example, a television, a high definition television (HDTV), a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, mobile telephone, mobile device, notebook computer, and home computing device. Portable device 165 or PC 170 may serve as user devices for data access from system 100. Portable device 165 and PC 170 may transmit and receive data and services from system 100.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for storing information associated with on demand content. The system may comprise a memory storage and a processing unit coupled to the memory storage. The processing unit may be operative to present, to a user via a user device, information associated with available on demand content. In addition, the processing unit may be operative to receive a user selection for an item of on demand content and to store, in a dedicated memory location for the user, identifying information for the selected item of on demand content.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, or other components. By way of example, the memory, processing unit, or other components may be implemented with STB 150, TV 155, CM 160, PC 170, portable device 165, or list processor 125, in combination with system 100. The aforementioned system and processors are examples and other systems and processors may comprise the aforementioned memory, processing unit, or other components, consistent with embodiments of the present invention.

Figure 2:
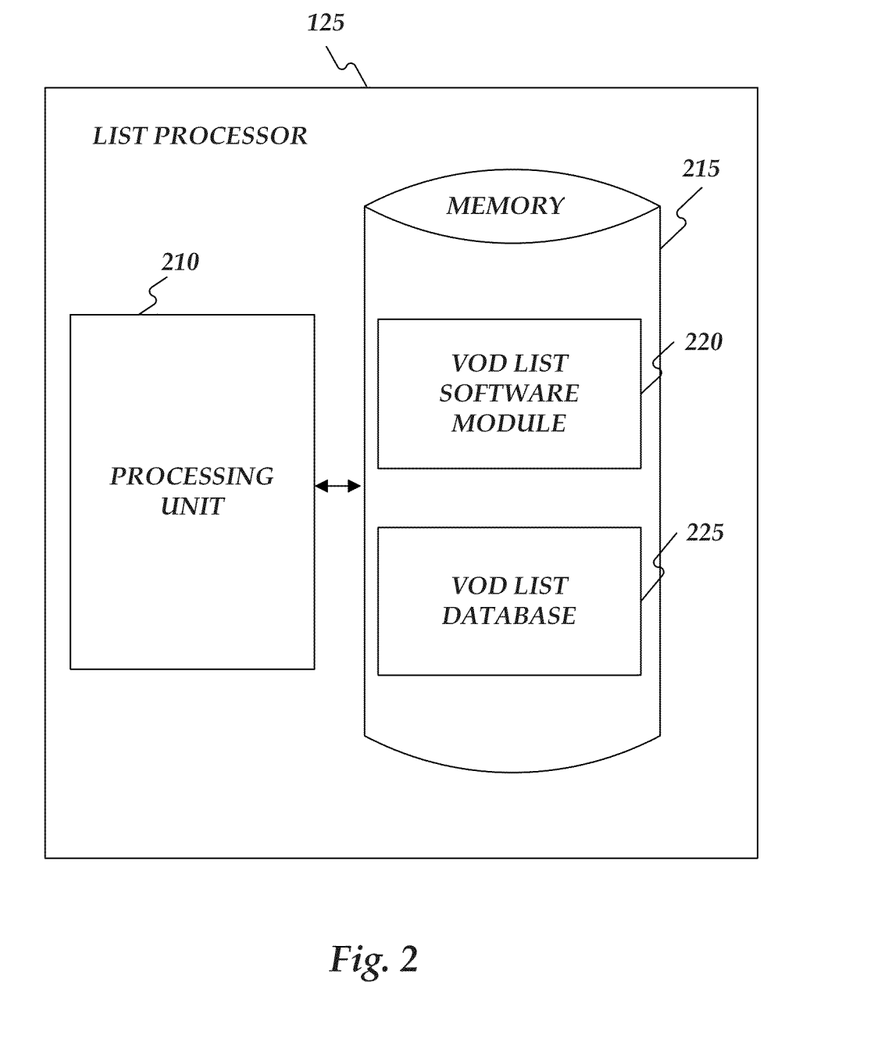
FIG. 2 is a block diagram of the list processor.

FIG. 2 shows list processor 125 of FIG. 1 in more detail. As shown in FIG. 2, list processor 125 may include a processing unit 210 and a memory unit 215. Memory 215 may include a VOD list software module 220 and a VOD list database 225. While executing on processing unit 210, VOD list software module 220 may perform processes for storing information associated with on demand content, in conjunction with, for example, one or more stages included in method 300 described below with respect to FIG. 3. Furthermore, VOD list software module 220 and VOD list database 225 may be executed on or reside in any element shown in FIG. 1. Moreover, any one or more of the stages included in method 300 may be performed on any element shown in FIG. 1 including, but not limited to, STB 150, TV 155, CM 160, PC 170, or portable device 165.

List processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
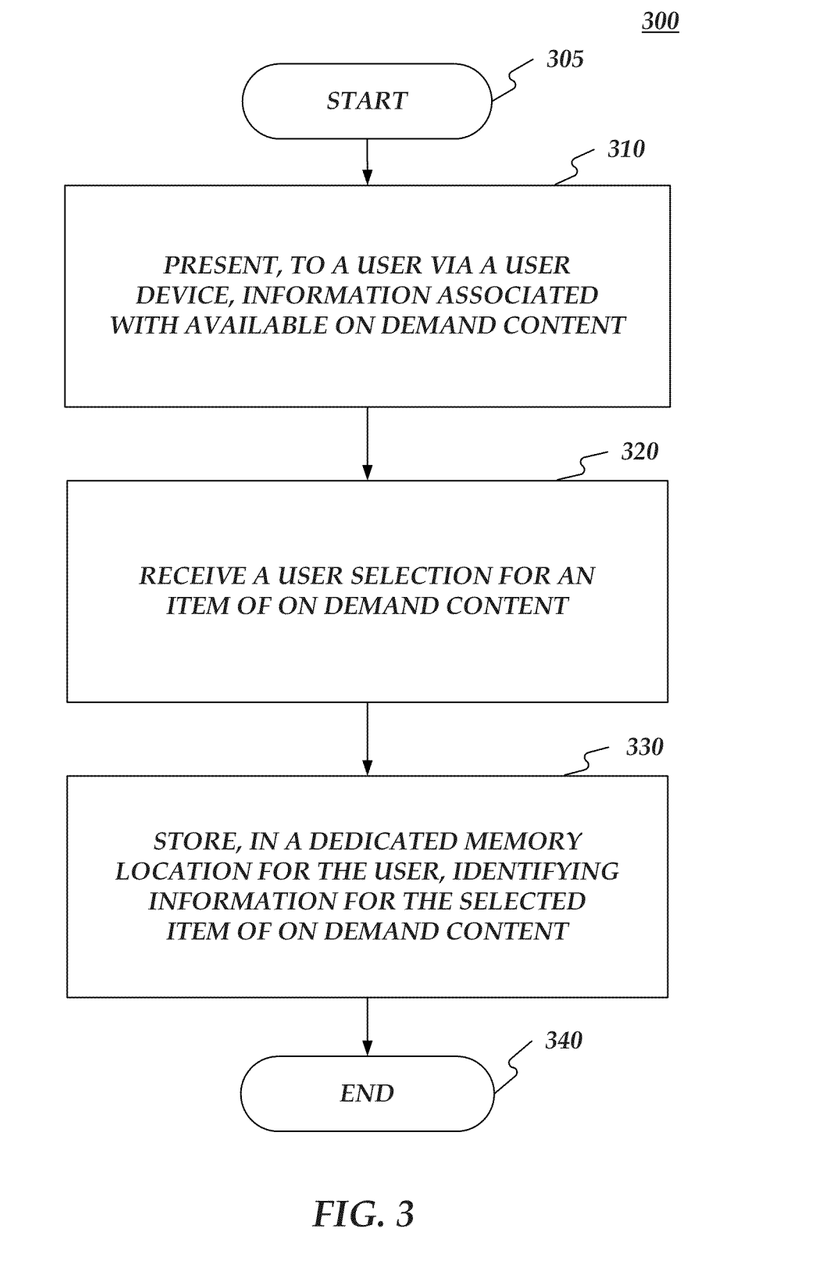
FIG. 3 is a flow chart of a method for storing information associated with on demand content.

FIG. 3 is a flow chart setting forth the general stages involved in a method 300 consistent with an embodiment of the invention for storing information associated with on demand content. Method 300 may be implemented using, for example, a STB 150 as described in more detail above with respect to FIG. 1. Embodiments of the invention may be implemented using devices other than and in addition to STB 150 including, but not limited to, CM 160, portable device 165, PC 170, list processor 125, or VOD server 120, for example. Ways to implement the stages of method 300 will be described in greater detail below.

Figure 4:
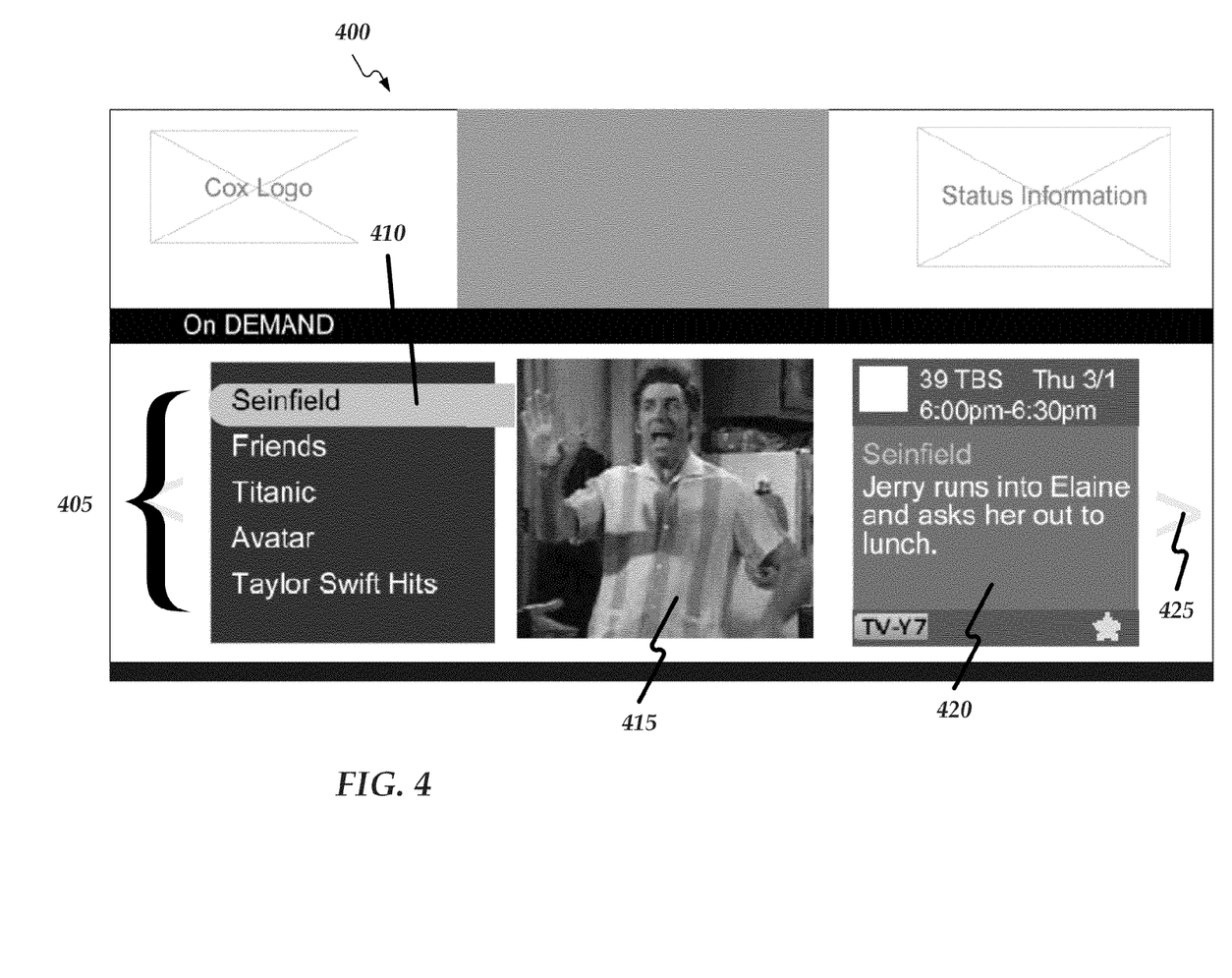
FIG. 4 illustrates a first screen.

Method 300 may begin at starting block 305 and proceed to stage 310 where STB 150 may present, to a user via a user device, information associated with available on demand content. For example, the user may use STB control device 175 to view and interact with a user guide on TV 155. At a point in viewing the user guide, the user may view a first screen 400 showing available VOD assets 405 as shown in FIG. 4. From available VOD assets 405, the user may select a first asset 410. As shown in first screen 400, the user may view a snippet 415 of selected first asset 410 or further information 420 corresponding to selected first asset 410.

Figure 5:
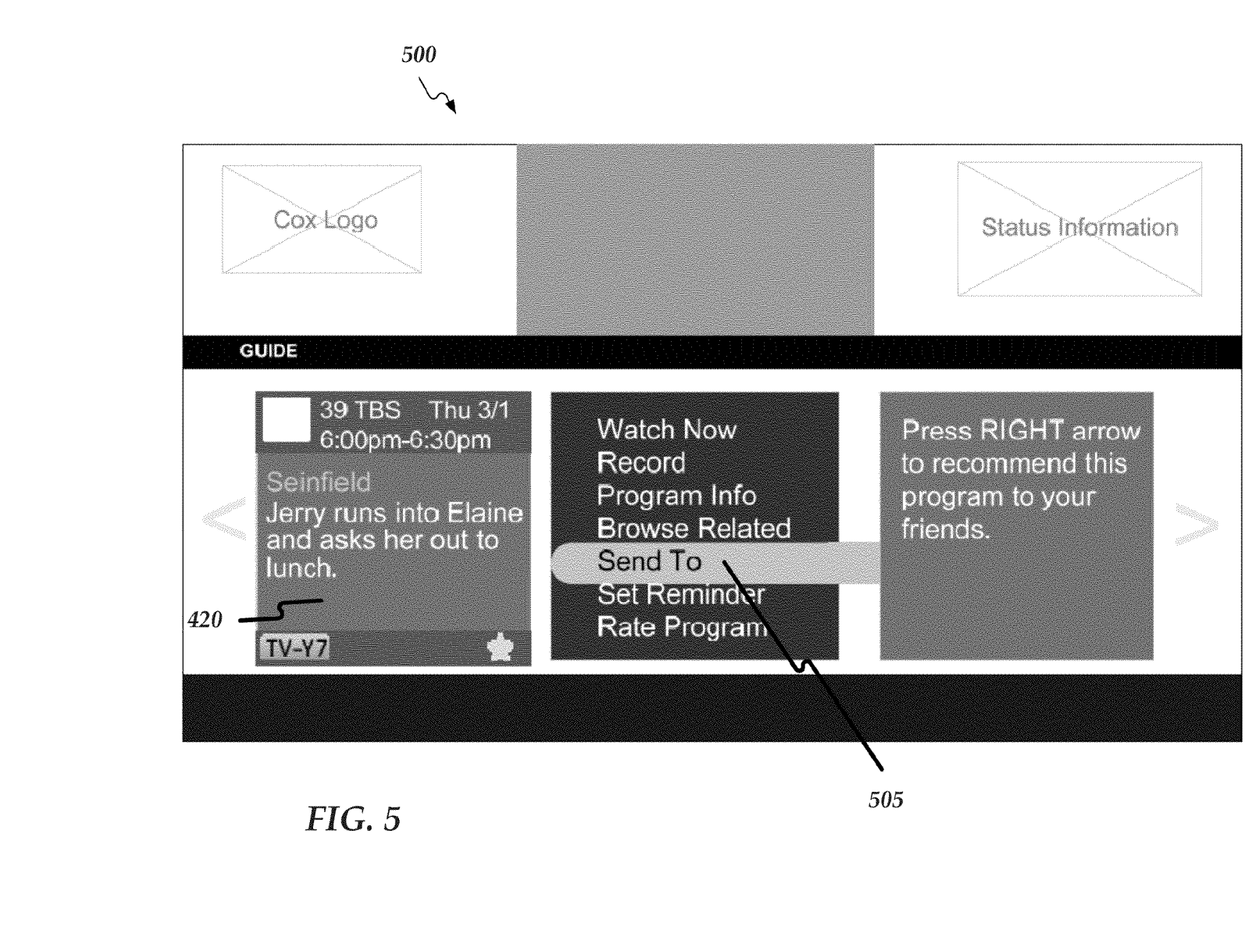
FIG. 5 illustrates a second screen.
Figure 6:
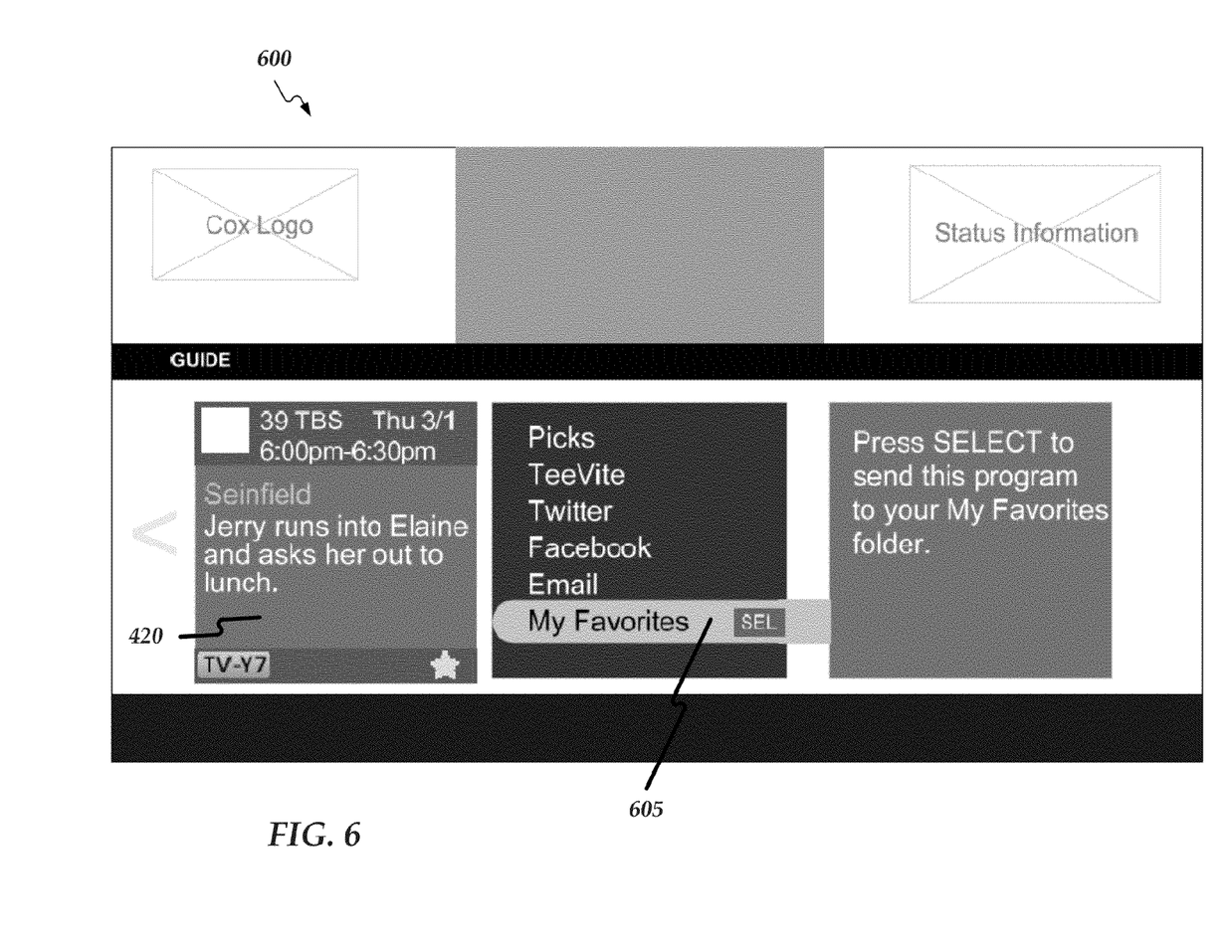
FIG. 6 illustrates a third screen.

From stage 310, where STB 150 presents, to the user via the user device, the information associated with the available on demand content, method 300 may advance to stage 320 where STB 150 may receive a user selection for an item of on demand content. For example, after pressing right arrow 425 of FIG. 4 twice, a second screen 500 may be displayed as shown in FIG. 5. From second screen 500, the user may select a "send to" button 505 that may cause a third screen 600 to be shown on TV 155. Third screen 600 may provide a plurality of places to send the section of selected first asset 410. One of the plurality of places to send the section of selected first asset 410 may comprise the My Favorites folder. By selecting a "My Favorites" button 605, the user my send to STB 150, which may receive, the user selection for the item of on demand content. In this example, the user selection for the item of on demand content may comprise a Seinfeld episode corresponding to selected first asset 410.

Once STB 150 receives the user selection for the item of on demand content in stage 320, method 300 may continue to stage 330 where STB 150 may store, in a dedicated memory location for the user, identifying information for the selected item of on demand content. For example, STB 150 may store identifying information for the user selection for the item of on demand content that may comprise a Seinfeld episode corresponding to selected first asset 410. This identifying information may be stored in VOD list database 225 and may be synchronized across multiple platforms. For example, this identifying information may be stored in portable device 165 (e.g. mobile device) and PC 170. In other words, any asset that is found in one platform or all platforms may be added to the My Favorites folder. Additionally, the My Favorites folder may be updated and synchronized across the three platforms in real-tine or near real-time. The user may able to view assets that are available on a specific platform and is able to view the full list (includes all assets or clips that are available on all platforms). Items that are on the list corresponding to the My Favorites folder, but are not available for particular platform, may be grayed out. For example, if an asset is only available for viewing from the STB and the user is accessing the list from the Web portal (e.g. PC 170), then the asset may be grayed out on the web portal when the user is trying to view it.

During a normal navigation of VOD assets, in addition to the purchase/play option, the user may have an additional option to add the asset to a My Favorites folder or to a playlist. After an asset has been added to the My Favorites folder, and the user navigates to the folder, the asset may appear in the folder along with other assets that were added previously and/or subsequently to the folder. The My Favorites folder may work across multiple platforms (e.g. STB, web portal, and mobile device) and may be associated with the user's STB. The user may able to add to the My Favorites folder to purchase or checkout assets using a wide variety of payment features. Such payment features may include, but are not limited to, credit card accounts, other electronic payment or e-commerce supported payments or features, or charging to an account with a service provider (e.g., a cable company account, satellite provider account, etc.).

Assets (e.g., video clips, sports events, etc.) available for viewing by a user may be differentiated by the platform(s) that it is available on. For example, if a movie is available for viewing on the STB, web portal, and mobile device, consistent with embodiments of the invention, the movie may be tagged with three corresponding icons that are displayed to the user. These three displayed icons may indicate that the movie is available for viewing on all three platforms. However, if the movie is not available on all three platforms, then icons corresponding to the non-available platform(s) may be absent or grayed out. Once STB 150 stores, in the dedicated memory location for the user, the identifying information for the selected item of on demand content in stage 330, method 300 may then end at stage 340.

Consistent with embodiments of the invention, advertisements may be inserted in the content (e.g. on demand content) accessed from the MyFavorites folder or playlist. Specifically, different advertisement payloads may be added in the content depending on the platform (e.g. set-top, web, mobile device, etc.) from which it is watched as well as advertisements targeting based on the personalized nature of the MyFavorites folder. For example, when a user selects an asset from the MyFavorites folder, the service provider can stream the content with demographically targeted advertisements as well as advertisements of different duration by platform. For example, a 10 second advertisement may be included in content played on a mobile device, a 20 second advertisement may be included in content played on the web, and a 30 second advertisement may be included in content played on the set-top. Moreover, advertisement payloads may be inserted between titles that are located on the playlist itself.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for storing information associated with content, the method comprising;
    presenting, to a user via a user device, information associated with available content;
    receiving a user selection for an item of content;
    storing, in a dedicated memory location for the user, identifying information for the selected item of content, the stored identifying information being synchronized across a plurality of platforms comprising one or more of: a set top box, a mobile device, and a computer;
    receiving a request from the user to view the stored identifying information;
    identifying one of the plurality of platforms from which the request from the user is received; and
    presenting the stored identifying information on the identified one of the plurality of platforms, wherein presenting the stored identifying information comprises displaying, along with the stored identifying information, an icon corresponding to each of the plurality of platforms, and wherein displaying the stored identifying information along with the icon corresponding to each of the plurality of platforms comprises:
        greying a presentation of the stored identifying information when the item of content is not available for viewing on the identified one of the plurality of platforms, and
        greying the icon corresponding to at least one of the plurality of platforms when the item of content is not available for viewing on the at least one of the plurality of platforms.

2. The method of claim 1, wherein storing the identifying information in the dedicated memory location comprises storing the identifying information in a My Favorites folder associated with the user.

3. The method of claim 1, wherein presenting the stored identifying information on the identified one of the plurality of platforms comprises presenting the stored identifying information on the identified one of the plurality of platforms comprising one of the following: the set top box, the mobile device, and the personal computer.

4. The method of claim 1, further comprising presenting the stored identifying information for the selected item to the user based upon a user navigation to the dedicated memory location.

5. The method of claim 4, wherein presenting the stored identifying information to the user comprises presenting the stored identifying information via a device different from the user device.

6. The method of claim 4, further comprising:
    receiving a user selection of the stored identifying information; and
    presenting, to the user, content corresponding to the selected stored identifying information.

7. The method of claim 1, further comprising facilitating a purchase of the selected item of content by the user.

8. The method of claim 1, further comprising adding the selected item of content to a play list associated with the user.

9. The method of claim 1, further comprising:
    identifying at least one type of device that may be utilized to present the selected item of content to the user; and
    storing, in the dedicated memory location, information associated with the identified at least one type of device.

10. A computer-readable storage device that stores a set of instructions which when executed perform a method for storing information associated with content, the method executed by the set of instructions comprising:
    presenting, to a user via a user device, information associated with available content;
    receiving a user selection for an item of content;
    storing, in a dedicated memory location for the user, identifying information for the selected item of content, the identifying information being synchronized across a plurality of platforms;
    receiving a request from the user to view the stored identifying information;
    identifying one of the plurality of platforms from which the request from the user is received; and
    presenting the stored identifying information on the identified one of the plurality of platforms, wherein presenting the stored identifying information comprises displaying, along with the stored identifying information, an icon corresponding to each of the plurality of platforms, and wherein displaying the stored identifying information along with the icon corresponding to each of the plurality of platforms comprises:
        greying a presentation of the stored identifying information when the item of content is not available for viewing on the identified one of the plurality of platforms, and
        greying the icon corresponding to at least one of the plurality of platforms when the item of content is not available for viewing on the at least one of the plurality of platforms.

11. The computer-readable storage device of claim 10, further comprising presenting the stored identifying information for the selected item to the user based upon a user navigation to the dedicated memory location.

12. The computer-readable storage device of claim 11, wherein presenting the stored identifying information to the user comprises presenting the stored identifying information via a device different from the user device.

13. The computer-readable storage device of claim 11, further comprising:
    receiving a user selection of the stored identifying information; and
    presenting, to the user, content corresponding to the selected stored identifying information.

14. The computer-readable storage device of claim 13, wherein presenting, to the user, the content corresponding to the selected stored identifying information further comprises presenting a demographically targeted advertisement.

15. The computer-readable storage device of claim 13, wherein presenting, to the user, the content corresponding to the selected stored identifying information further comprises presenting an advertisement having a duration based upon a user device type the content is presented to.

16. The computer-readable storage device of claim 10, wherein presenting, to the user via the user device, the information associated with available content comprises presenting the information associated with available content including an advertisement.

17. The computer-readable storage device of claim 10, further comprising facilitating a purchase of the selected item of content by the user.

18. The computer-readable storage device of claim 10, further comprising adding the selected item of content to a play list associated with the user.

19. The computer-readable storage device of claim 10, further comprising:
   identifying at least one type of device that may be utilized to present the selected item of content to the user; and
   storing, in the dedicated memory location, information associated with the identified at least one type of device.

20. A system for storing information associated with content, the system comprising:
   a memory storage; and
   a processing unit coupled to the memory storage, wherein the processing unit is configured to:
      present, to a user via a user device, information associated with available content;
      receive a user selection for an item of content;
      store, in a dedicated memory location for the user, identifying information for the selected item of content wherein the processing unit being operative to store the identifying information in the dedicated memory location comprises the processing unit being operative to store the identifying information in a My Favorites folder associated with the user; and
   present the stored identifying information for the selected item to the user based upon a user navigation to the dedicated memory location, wherein presenting the stored identifying information comprises displaying along with the stored identifying information, an icon corresponding to each of the plurality of platforms, and wherein displaying the stored identifying information along with the icon corresponding to each of the plurality of platforms comprises:
      greying a presentation of the identifying information when the item of content is not available for viewing on the identified one of the plurality of platforms, and
      greying the icon corresponding to at least one of the plurality of platforms when the item of content is not available for viewing on the at least one of the plurality of platforms.

21. The system of claim 20, wherein the processing unit being operative to present the stored identifying information to the user comprises the processing unit being operative to present the stored identifying information via a device different from the user device.

* * * * *